March 25, 1924.  
R. L. SKINNER  
1,487,759

VEHICLE WHEEL GAUGE

Filed Sept. 18, 1919  2 Sheets-Sheet 1

Inventor  
Ralph L. Skinner

Witness  
Ed. R. Luoby

By Norman T. Whitaker  
his Attorney

March 25, 1924.
R. L. SKINNER
VEHICLE WHEEL GAUGE
Filed Sept. 18, 1919    2 Sheets-Sheet 2
1,487,759
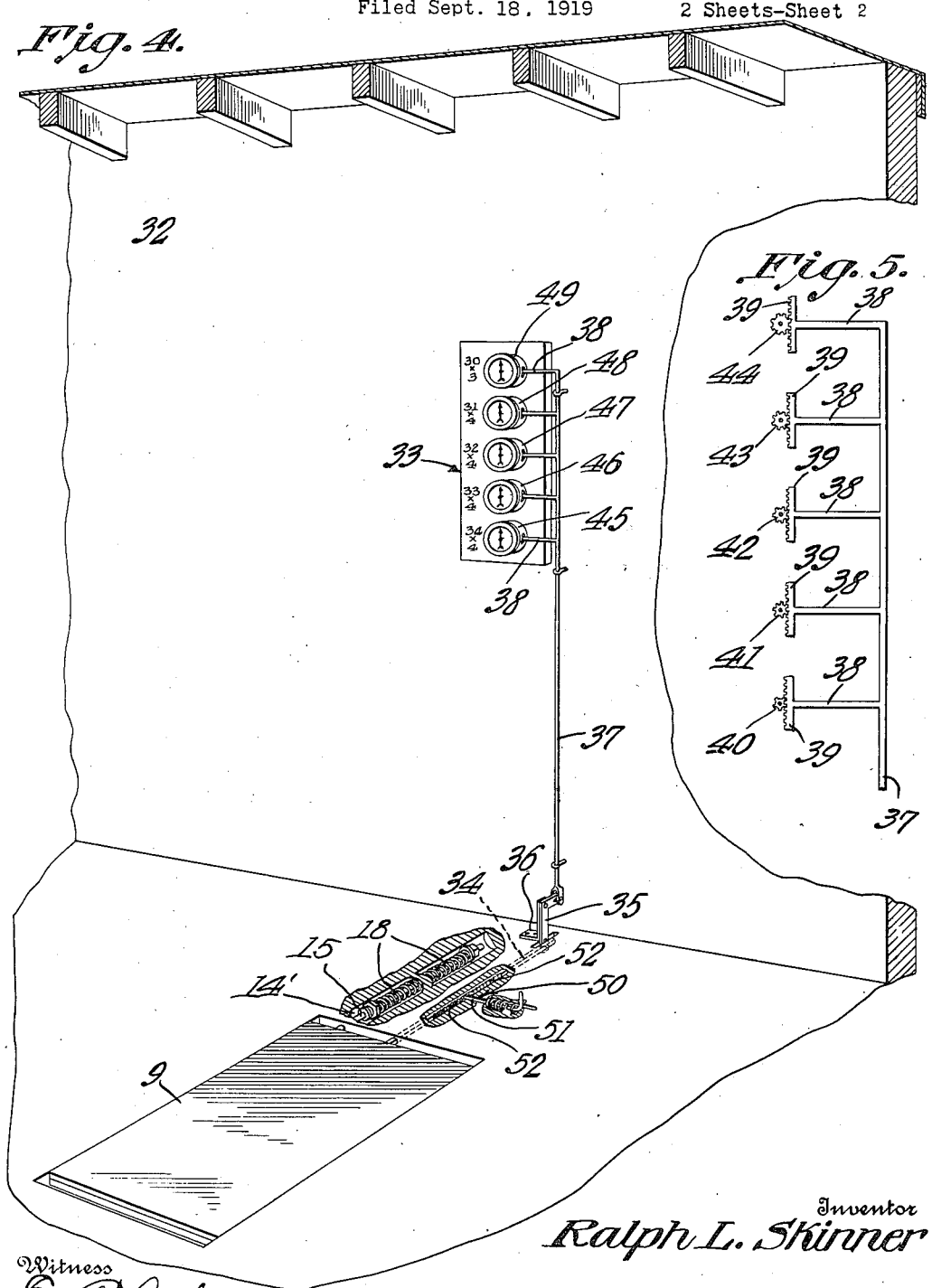
Witness
Ed. R. Lusby
Inventor
Ralph L. Skinner
By Norman T. Whitaker
his Attorney Patented Mar. 25, 1924.

1,487,759

UNITED STATES PATENT OFFICE.

RALPH L. SKINNER, OF SACRAMENTO, CALIFORNIA.

VEHICLE WHEEL GAUGE.

Application filed September 18, 1919. Serial No. 324,423.

*To all whom it may concern:*

Be it known that I, RALPH L. SKINNER, a citizen of the United States, and resident of Sacramento, in the county of Sacramento and State of California, have invented certain new and useful Improvements in Vehicle Wheel Gauges, of which the following is a specification.

This invention relates to vehicle wheel gauges and has particular reference to that class of appliances adapted to be used as a means for determining whether or not the wheels of a vehicle, particularly those of an automobile, are in true alignment.

An important object of the invention is to provide in a device of the above-mentioned character means whereby the deviation of an automobile wheel from its true line of travel may be readily determined.

A further aim of the invention is to supply in a device of this general type means permitting the deviation of a vehicle wheel carrying any standard size tire to be readily determined.

An additional purpose of the invention is to equip a device having these desirable characteristics with means enabling the several co-operative elements thereof to be locked in their newly-assumed positions in order to enable a reading to be accurately made.

A supplemental end of the invention is the provision in an appliance of this character of means whereby the several co-acting members thereof may be shielded or protected from obstructions or obstacles likely to damage or injure them or impair the operation thereof.

Other objects and advantages of the invention will be apparent during the course of the following description taken in connection with the accompanying drawings:

In these drawings, forming a part of this specification, and wherein like reference numerals are employed to designate like parts throughout the same, Figure 1 is a top plan view of the device embodying my invention;

Figure 4 illustrates a modified embodiment of the invention; and

Figure 5 shows a portion of the operating mechanism for the structure depicted in Figure 4.

Figure 1:
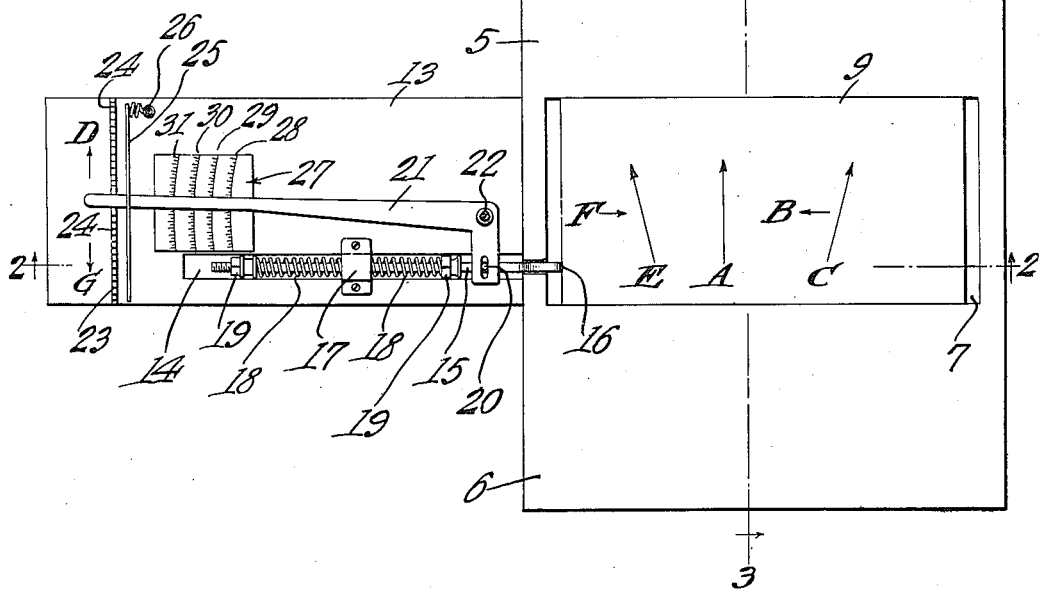
Figure 2:
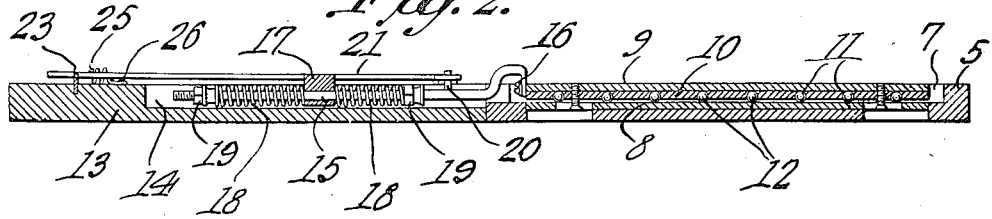
Figure 2 is a vertical sectional view taken on line 2—2 of Figure 1.
Figure 3:
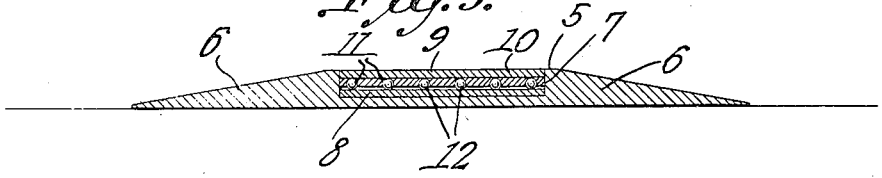
Figure 3 is a similar view taken on line 3—3 of Figure 1.

In these drawings, attention being directed to Figures 1, 2, and 3, wherein is shown one form of the invention, the reference numeral 5 indicates a base-plate having tapered wings or beveled side marginal portions 6 over which the wheel of the automobile is adapted to travel when a reading for the accuracy of the wheel alignment is to be made. Such base-plate 5 is provided with a recess 7 accommodating a stationary plate 8 adapted to receive a reciprocating or movable platform 9 thereon. Such platform is supplied on its under side with a filler-plate 10 having a plurality of openings or cavities 11 formed therein for the reception of ball-bearings 12 mounted upon or adapted to roll on the underlying supporting plate 8. As will be readily understood, these ball-bearings 12 are employed as anti-friction means to enable the platform or plate 9 to be freely moved horizontally upon the plate 8 as will hereinafter be more fully described. In the present embodiment of the invention I have shown ball-bearings as anti-friction means but it is to be understood that any other suitable anti-friction device may be employed.

To the base-plate 5 there is suitably connected an extension or auxiliary plate 13 having a recess 14 in its top face in which a reciprocating rod 15 secured to the platform 9 as shown at 16 is slidingly mounted. This rod 15 is slidable in a guide or bearing 17 fastened to the element 13 and is equipped with a pair of coil-springs 18, 18 disposed on opposite sides of and bearing on the guide 17 as is clearly shown in Figures 1 and 2. The tension of the opposed springs is modified or changed to meet varying conditions by means of adjustable nuts 19, 19 carried by the rod. Rod 15 is provided with a pin or lug 20 in a short slot of the shorter arm of a bell-crank lever or indicator 21 fulcrumed on the part 13 at 22. The free end of arm 21 is adapted to move in either direction over a rack 23 provided on its top edge with oppositely-disposed teeth 24 adapted to retain the arm or indicator in a given position when it is moved in either direction from its central normal position. As a means for retaining the free or indicator end of the arm 21 in engagement with the teeth of the rack, a spring bearing on the top of the arm is employed, such spring being secured to the element 13 at 26. Upon the plate 13 beneath the arm 21 a graduated multiple scale, indicated as a whole by the reference numeral 27, is employed, such scale being provided with different sets of graduations as shown at 28, 29, 30, and 31, the scale 28 being used to indicate the deviation of small wheels while the scale 31 is employed to determine the deviation of large wheels, the intermediate scales being used for wheels of intervening sizes.

The operation of this appliance is practically as follows:

When the wheel of a vehicle rolls over the shiftable platform 9 in the general direction of the arrow A, a movement of such platform in the direction of arrow B will be brought about if the wheel is set at an angle to the general line of travel of the vehicle corresponding to the angle between the arrows C and A, thereby causing a movement of the free end of the arm 21 in the direction of the arrow D. When such arm assumes its new position as a result of the travel of the automobile wheel over the platform 9, it is locked therein by means of the teeth 24 having engagement therewith. As has been described hereinabove, the elongated spring 25 serves to retain the free end of the arm 21 in proper engagement with the rack-teeth, thereby insuring the locking of the arm when moved from its normal position. By reading the indication of the arm 21 on the scale 28 the amount of deviation of a vehicle wheel in a given direction may be determined for a small tire, as, for example, a tire having a diameter of 30 inches. If the diameter of the tire should be, say 34 inches, a reading on scale 31 would enable one to ascertain the amount of deviation. If the wheel traversing the platform 9 is set at an angle indicated by the arrow E, a movement of the platform 9 in the direction of arrow F will be brought about, thereby moving the arm 21 from its normal or central position shown in Figure 1 in the direction of arrow G, whereupon it is locked as hereinbefore described by means of the teeth 24 in its newly-assumed position, whereupon a reading of the scale corresponding to the diameter of the automobile tire may be made to determine the extent of deviation of the wheel from its true line of travel.

In Figure 4 wherein is shown a modified form of the device, it will be noted that the movable platform 9, together with its several co-operating elements is set into the floor of a building, such as a garage, a portion of which structure is indicated by the numeral 32, the device shown in this figure being intended to be used as a permanent garage fixture of a public garage or the like while the form of the invention set forth in Figures 1, 2, and 3, is intended primarily for employment in a private garage, although it is not limited to that particular use. The rod 15, together with the springs 18, 18 and their several co-operating elements, are also embedded within a chamber 14' formed within the floor of the garage. Instead of using the scale 27 hereinbefore described, in this instance a different form of gauge shown at 33 is employed, which is actuated through the instrumentality of a reciprocating rod 34 suitably connected to the movable platform 9. This rod 34 is in turn connected to a bell-crank lever 35 fulcrumed or pivotally connected to a bracket 36. Lever 35 is pivotally connected to the lower end of a vertical rod 37 equipped with a plurality of lateral arms 38, each of which is provided with a rack 39. Such racks are in intermeshing or operative engagement with different size pinions 40, 41, 42, 43, 44, forming parts of indicators 45, 46, 47, 48, and 49. By moving the rod 37 a given distance, it is apparent that the indicator hands of the several indicators will be moved different distances, the indicator which has its index or needle moved the greatest distance being used when a measurement is being made for the deviation of a large tire, as, for example, a tire having a diameter of 34 inches, while the gauge the pointer of which moves the shortest distance is used when a test is being made of wheels employing the smallest size tire, as, for example, one of a diameter of 30 inches.

The operation of this modified form of device is substantially identical with that of the form of appliance shown in Figures 1, 2, and 3, the readings, however, being made for a given size wheel tire upon the indicator corresponding thereto. For locking the pointers or needles of the indicators I employ a pawl and ratchet mechanism shown at 50, the pawl being adapted to engage the ratchet teeth 52 carried by the rod 34 and retain the rod in a given position when the platform is moved in either direction as hereinbefore described.

In order to permit the several co-operating elements of the device shown in Figures 1, 2, and 3, to be moved under the influence of springs 18 to their normal position shown in Figure 1, it is only necessary to lift the free end of the arm 21, which is more or less flexible, out of engagement with the teeth 24 of the rack, and to permit the various co-acting members of the devices shown in Figure 4 to be moved to their normal position shown, it is only necessary to retract the pawl 51 out of engagement with its co-operative ratchet teeth 52, thus freeing the parts so that they may respond to the action of the springs 18.

It is to be understood that the forms of my invention herewith shown and described are to be taken as preferred embodiments of the same and that various changes in the shape, size, and arrangement of parts may be resorted to without departing from the spirit of the invention or the scope of the subjoined claims.

Having thus described my invention, what I claim as new and desire to secure and protect by Letters Patent of the United States, is:

1. A vehicle wheel gauge comprising a movable element adapted to be placed in the path of travel of the vehicle wheel and laterally shiftable with reference to said path, an indicator, means for actuating said indicator upon the movement of said movable element to indicate the angular relation of the wheel to the path of travel of the same when said movable element is traversed by the vehicle wheel, and means for locking said movable element and indicator in its newly assumed position.

2. A vehicle wheel alining device comprising a movable element adapted to be placed in the path of travel of the vehicle wheel, an indicator, means for actuating said indicator upon the movement of said movable element to indicate the angular relation of the wheel to the path of travel of the same when said movable element is traversed by the vehicle wheel, and means for retaining said movable element in a normal position.

3. A vehicle wheel alining device comprising a movable element adapted to be placed in the path of travel of the vehicle wheel, an indicator, means for actuating said indicator upon the movement of said movable element to indicate the angular relation of the wheel to the path of travel of the same when said movable element is traversed by the vehicle wheel, and spring tension means for retaining said movable element in a normal position.

4. A vehicle wheel gauge comprising a movable element adapted to be placed in the path of travel of the vehicle wheel and to be moved as a result of the contact of the vehicle wheel therewith, an indicator, and means for actuating said indicator upon the movement of said movable element to indicate the angular relation of any size wheel to the path of travel of the same when said movable element is moved.

5. A vehicle wheel gauge comprising a movable element adapted to be placed in the path of travel of the vehicle wheel and to be moved as a result of the contact of the vehicle wheel therewith, the movement of said movable element being dependent upon the angular relation of the wheel to the path of travel of the same, and means operated upon the movement of said movable element to indicate the angular relation of any size wheel to the path of travel of the same.

6. A vehicle wheel gauge comprising a movable element adapted to be placed in the path of travel of the vehicle wheel and to be moved as a result of the contact of the vehicle wheel therewith, the movement of said movable element being dependent upon the angular relation of the wheel to the path of travel of the same, and means operated upon the movement of said movable element to show the angular relation of any size wheel to the path of travel of the same, said means including a plurality of indicators corresponding to different sized vehicle wheels.

7. A vehicle wheel gauge comprising a movable element adapted to be placed in the path of travel of the vehicle wheel and to be moved as a result of the contact of the vehicle wheel therewith, the movement of said movable element being dependent upon the angular relation of the wheel to the path of travel of the same, means operated upon the movement of said movable element to show the angular relation of any size wheel to the path of travel of the same, said means including a plurality of indicators corresponding to different sized vehicle wheels, and means for retaining said movable element in its newly assumed position to enable said indicators to be accurately read.

8. A vehicle wheel alining device comprising a movable element adapted to be placed in the path of travel of the vehicle wheel, an indicator, and means for actuating said indicator upon the movement of said movable element to indicate the angular relation of the wheel to the path of travel of the same when said movable element is traversed by the vehicle wheel.

9. A testing apparatus of the character stated, comprising a track-forming base adapted to support and permit the movement of a wheeled vehicle thereon, said base including a fixed portion and a movable platform, means whereby the platform is normally held in a predetermined position on said base, but so as to be movable crosswise to the path of travel of the vehicle in either direction from such position by the rolling thereon of a wheel out of alinement, and indicating means operable by movements of said platform.

10. A testing apparatus of the character stated, comprising a track-forming base adapted to support and permit the movement of a wheeled vehicle thereon, said base including a fixed portion, and a platform movable crosswise of the path of travel of the vehicle, yielding means normally maintaining the platform in a predetermined position relatively to said path, and permitting it to be moved in either direction from said position, by the rolling thereon of a wheel out of alinement, and indicating means operable by movements of the platform.

RALPH L. SKINNER.